(12) United States Patent
Chen et al.

(10) Patent No.: US 12,462,399 B2
(45) Date of Patent: Nov. 4, 2025

(54) TRAJECTORY PREDICTING METHOD AND COMPUTING SYSTEM FOR TRAJECTORY PREDICTION

(71) Applicant: Wistron Corporation, New Taipei (TW)

(72) Inventors: Xiu Zhi Chen, Taipei (TW); Jyun Hong He, Taipei (TW); Yen Lin Chen, Taipei (TW); Yung Jen Chen, Taipei (TW); Yi Kai Chiu, Taipei (TW); You Shiuan Lin, Taipei (TW); Kuo-Lun Huang, New Taipei (TW); Ke Kang Chen, New Taipei (TW); Shao-Chi Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 463 days.

(21) Appl. No.: 17/975,554

(22) Filed: Oct. 27, 2022

(65) Prior Publication Data
US 2024/0013406 A1   Jan. 11, 2024

(30) Foreign Application Priority Data
Jul. 7, 2022  (TW) ................... 111125486

(51) Int. Cl.
*G06T 7/246*  (2017.01)
*G06N 5/022*  (2023.01)
(Continued)

(52) U.S. Cl.
CPC .......... *G06T 7/246* (2017.01); *G06N 5/022* (2013.01); *G06T 7/62* (2017.01); *G06V 10/7715* (2022.01);
(Continued)

(58) Field of Classification Search
CPC .. G06N 3/0442; G06N 3/0455; G06N 3/0464; G06N 3/0475; G06N 3/094;
(Continued)

(56) References Cited

U.S. PATENT DOCUMENTS 11,554,785 B2 *  1/2023  Siddiqui ............... G06T 7/246
12,037,027 B2 *  7/2024  Suo ....................... G06N 20/00
(Continued)

FOREIGN PATENT DOCUMENTS

CN  113989326  1/2022
CN  114450724  5/2022
(Continued)

OTHER PUBLICATIONS

Kyung-Yong Kim et al., "Adaptive Depth-Map Coding for 3D-Video", IEICE Trans. Inf. & Syst., vol. E93-D, No. 8, 067403, Aug. 2010, pp. 2262-2272.
(Continued)

*Primary Examiner* — Zhiyu Lu
(74) *Attorney, Agent, or Firm* — JCIPRNET

(57) ABSTRACT

A trajectory predicting method and a computing system for trajectory prediction are provided. In the method, feature extraction is respectively performed on past trajectories of multiple target objects through an encoder to generate first trajectory information of the target objects. A pooling process is performed on the first trajectory information of the target objects to generate second trajectory information of the target objects. The second trajectory information of each target object includes location relationships relative to other target objects. Third trajectory information is obtained from the past trajectories of the target objects. The third trajectory information includes a moving direction, scene information, and/or a moving mode. The predicted trajectories of the target objects are generated according to the second trajec-
(Continued)

tory information and the third trajectory information through a decoder. Accordingly, the accuracy of prediction can be improved.

18 Claims, 14 Drawing Sheets

(51) Int. Cl.
    *G06T 7/62*     (2017.01)
    *G06V 10/77*     (2022.01)

(52) U.S. Cl.
    CPC ............... *G06T 2207/10028* (2013.01); *G06T 2207/20081* (2013.01); *G06T 2207/20084* (2013.01); *G06T 2207/30241* (2013.01)

(58) Field of Classification Search
    CPC .......... G06N 5/022; G06T 2207/10028; G06T 2207/20081; G06T 2207/20084; G06T 2207/30241; G06T 7/246; G06T 7/62; G06V 10/7715; G06V 10/82; G06V 20/64
    See application file for complete search history.

(56) References Cited

U.S. PATENT DOCUMENTS

| | | | | |
|---|---|---|---|---|
| 2020/0082248 | A1* | 3/2020 | Villegas | G06N 3/044 |
| 2021/0295171 | A1* | 9/2021 | Kamenev | G06N 3/088 |
| 2023/0088912 | A1* | 3/2023 | Villegas | B60W 40/02 |
| | | | | 706/23 |

FOREIGN PATENT DOCUMENTS

| | | |
|---|---|---|
| CN | 114692762 | 7/2022 |
| WO | 2016156236 | 10/2016 |
| WO | 2021189009 | 9/2021 |

OTHER PUBLICATIONS

Alexandre Robicquet et al., "Learning Social Etiquette: Human Trajectory Understanding in Crowded Scenes", European Conference on Computer Vision, Oct. 2016, pp. 1-17.

Zhijian Liu et al., "Point-Voxel CNN for Efficient 3D Deep Learning", 33rd Conference on Neural Information Processing Systems (NeurIPS 2019), Dec. 9, 2019, pp. 1-11.

Agrim Gupta et al., "Social GAN: Socially Acceptable Trajectories with Generative Adversarial Networks", Mar. 29, 2018, pp. 2255-2264. Available at: https://arxiv.org/pdf/1803.10892.pdf.

"Office Action of Taiwan Counterpart Application", issued on Mar. 24, 2023, p. 1-p. 16.

* cited by examiner

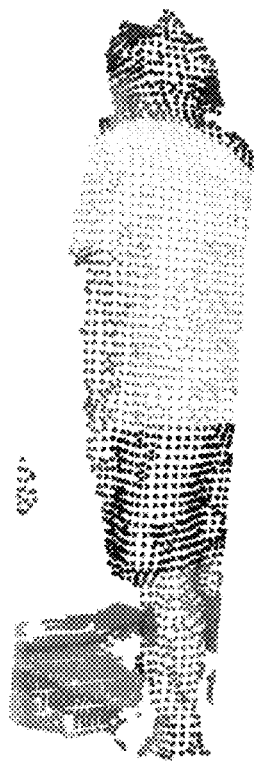
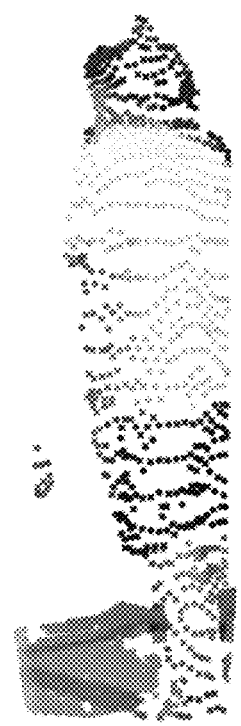
FIG. 8A　　　　　　　　FIG. 8B
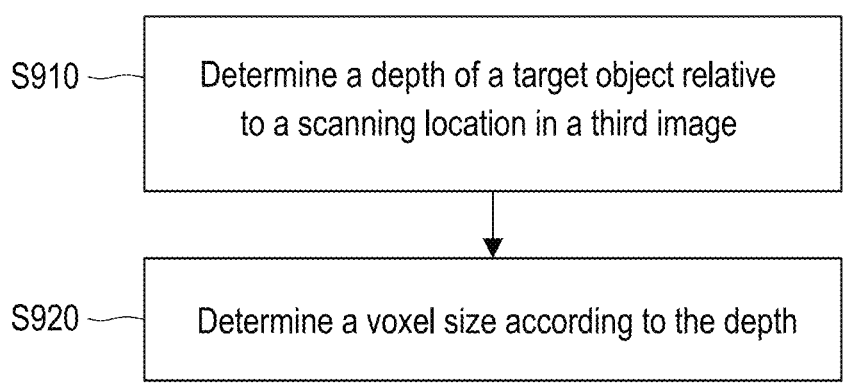
FIG. 9

TRAJECTORY PREDICTING METHOD AND COMPUTING SYSTEM FOR TRAJECTORY PREDICTION

CROSS-REFERENCE TO RELATED APPLICATION

This application claims the priority benefit of Taiwan application serial no. 111125486, filed on Jul. 7, 2022. The entirety of the above-mentioned patent application is hereby incorporated by reference herein and made a part of this specification.

BACKGROUND

Technical Field

The disclosure relates to a trajectory processing technology, and in particular to a trajectory predicting method and a computing system for trajectory prediction.

Description of Related Art

Trajectory prediction is one of the common stages in many smart applications. A prediction result may be used as a reference to complete automatic warning or parameter adjustment. A trajectory prediction task includes object detection and identification procedures. Through the procedures, a target object may be further filtered out, and the trajectory prediction may be performed only on the target object, thereby improving application efficiency.

Conventional object detection and identification methods refer to two-dimensional (2D) information captured by a camera. However, only relying on color information in the 2D information is likely to cause instability in the performance of many applications, such as misjudgment of a human shaped cardboard cutout and misjudgment of volume caused by the angle. Therefore, in recent years, in some related applications (for example, a smart roadside device, a robot, an autonomous car, etc.) that require highly stable detection and identification, sensors that can capture three-dimensional (3D) information have been introduced. However, after introducing the 3D information, the huge amount of information increases the burden on a system, causing the system to be unable to meet the real-time requirement of the applications.

It is also worth noting that in addition to the issue that the prior art uses a pedestrian as the target object, the prior art also cannot complete accurate trajectory prediction for multiple target objects.

SUMMARY

The disclosure provides a trajectory predicting method and a computing system for trajectory prediction, which are suitable for various objects and can improve prediction efficiency.

An embodiment of the disclosure provides a trajectory predicting method based on a predicting model. The predicting model includes a generator network, and the trajectory predicting method includes (but is not limited to) the following steps. Feature extraction is respectively performed on past trajectories of multiple target objects through an encoder to generate first trajectory information of the target objects. The encoder is used to obtain a hidden state representing moving characteristics reflected by the past trajectories, and the first trajectory information includes the hidden state. A pooling process is performed on the first trajectory information of the target objects to generate second trajectory information of the target objects. The pooling process is used to obtain relationships between the first trajectory information of the target objects, and the second trajectory information of each target object includes location relationships relative to other target objects. Third trajectory information is obtained from the past trajectories of the target objects. The third trajectory information includes a moving direction, scene information, and/or a moving mode. The trajectories of the target objects are generated according to the second trajectory information and the third trajectory information of the target objects are processed through a decoder.

A computing system for trajectory prediction according to an embodiment of the disclosure includes (but is not limited to) a memory and a processor. The memory is used to store a code. The processor is coupled to the memory. The processor is configured to load and execute the code to execute a predicting model. The predicting model includes a generator network. The processor is further used to respectively perform feature extraction on past trajectories of multiple target objects through an encoder to generate first trajectory information of the target objects, perform a pooling process on the first trajectory information of the target objects to generate second trajectory information of the target objects, obtain third trajectory information from the past trajectories of the target objects, and generate predicted trajectories of the target objects according to the second trajectory information and the third trajectory information of the target objects through a decoder. The encoder is used to obtain a hidden state representing moving characteristics reflected by the past trajectories, and the first trajectory information includes the hidden state. The pooling process is used to obtain relationships between the first trajectory information of the target objects, and the second trajectory information of each target object includes location relationships relative to other target objects. The third trajectory information includes a moving direction, scene information, and/or a moving mode.

Based on the above, the trajectory predicting method and the computing system for trajectory prediction according to the embodiments of the disclosure refer to more trajectory information, thereby being suitable for trajectory prediction of multiple target objects.

In order for the features and advantages of the disclosure to be more comprehensible, the following specific embodiments are described in detail in conjunction with the drawings.

BRIEF DESCRIPTION OF THE DRAWINGS

FIG. 8A and FIG. 8B are point cloud images of two voxel sizes according to an embodiment of the disclosure.

FIG. 9 is a flowchart of depth-based voxel size determination according to an embodiment of the disclosure.

DETAILED DESCRIPTION OF DISCLOSED EMBODIMENTS

Figure 1:
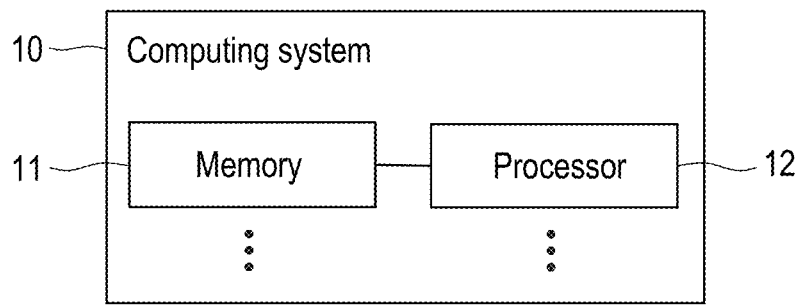
FIG. 1 is a block diagram of elements of a computing system according to an embodiment of the disclosure.

FIG. 1 is a block diagram of elements of a computing system 10 according to an embodiment of the disclosure. Referring to FIG. 1. The computing system 10 includes (but is not limited to) one or more memories 11 and one or more processors 12. The computing system 10 may be one or more desktop computers, notebook computers, smart phones, tablet computers, servers, or other electronic devices.

The memory 11 may be any type of fixed or removable random access memory (RAM), read only memory (ROM), flash memory, hard disk drive (HDD), solid-state drive (SSD), or similar elements. In an embodiment, the memory 11 is used to store a code, a software module, a configuration, data, or a file (for example, trajectory information, a model parameter, image information, or a size ratio).

The processor 12 is coupled to the memory 11. The processor 12 may be a central processing unit (CPU), a graphics processing unit (GPU), other programmable general-purpose or specific-purpose microprocessors, digital signal processors (DSPs), programmable controllers, field programmable gate arrays (FPGAs), application-specific integrated circuits (ASICs), neural network accelerators, other similar elements, or a combination of the above elements. In an embodiment, the processor 12 is used to execute all or some operations of the computing system 10, and may load and execute each code, software module, file, and data stored in the memory 11. In some embodiments, some operations in the method according to the embodiment of the disclosure may be implemented through different or the same processor 12.

Hereinafter, the method according to the embodiment of the disclosure will be described in conjunction with various devices, elements, and modules in the computing system 10. Each procedure of the method may be adjusted accordingly according to the implementation situation and is not limited thereto. In some embodiments, some procedures may be implemented through different processors 12.

Figure 2:
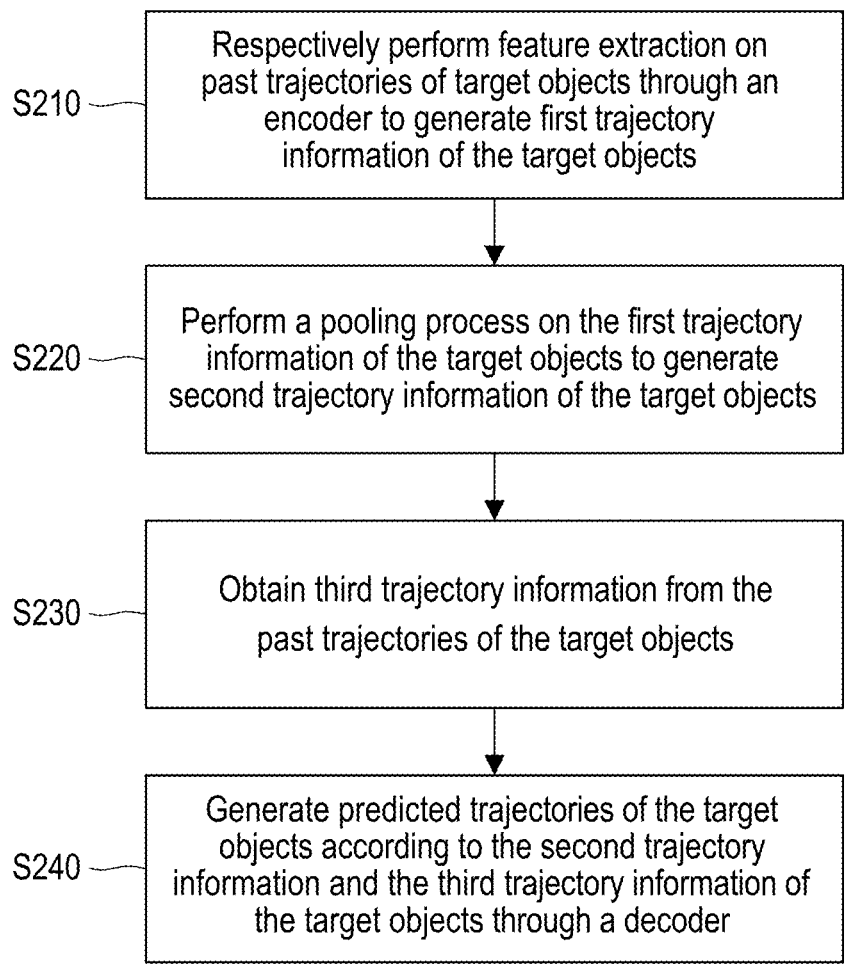
FIG. 2 is a flowchart of a trajectory predicting method according to an embodiment of the disclosure.

FIG. 2 is a flowchart of a trajectory predicting method according to an embodiment of the disclosure. Please refer to FIG. 2. The processor 12 respectively performs feature extraction on past trajectories of one or more target objects through an encoder to generate first trajectory information of the target objects (Step S210). Specifically, the target object may be a person, other animals, a vehicle, a living thing, or other objects. The object types of the target objects may be the same or may be different. The past trajectory of each target object includes a past location thereof. For example, if a certain time point is t, the past trajectories may be locations of time points t−5, t−4, t−3, t−2, and t−1. The locations arranged in chronological order in the trajectory may be separated by the same or different periods. Additionally, the location may be in latitude and longitude, a relative location, or in a coordinate format of a specific coordinate system.

Figure 3A:
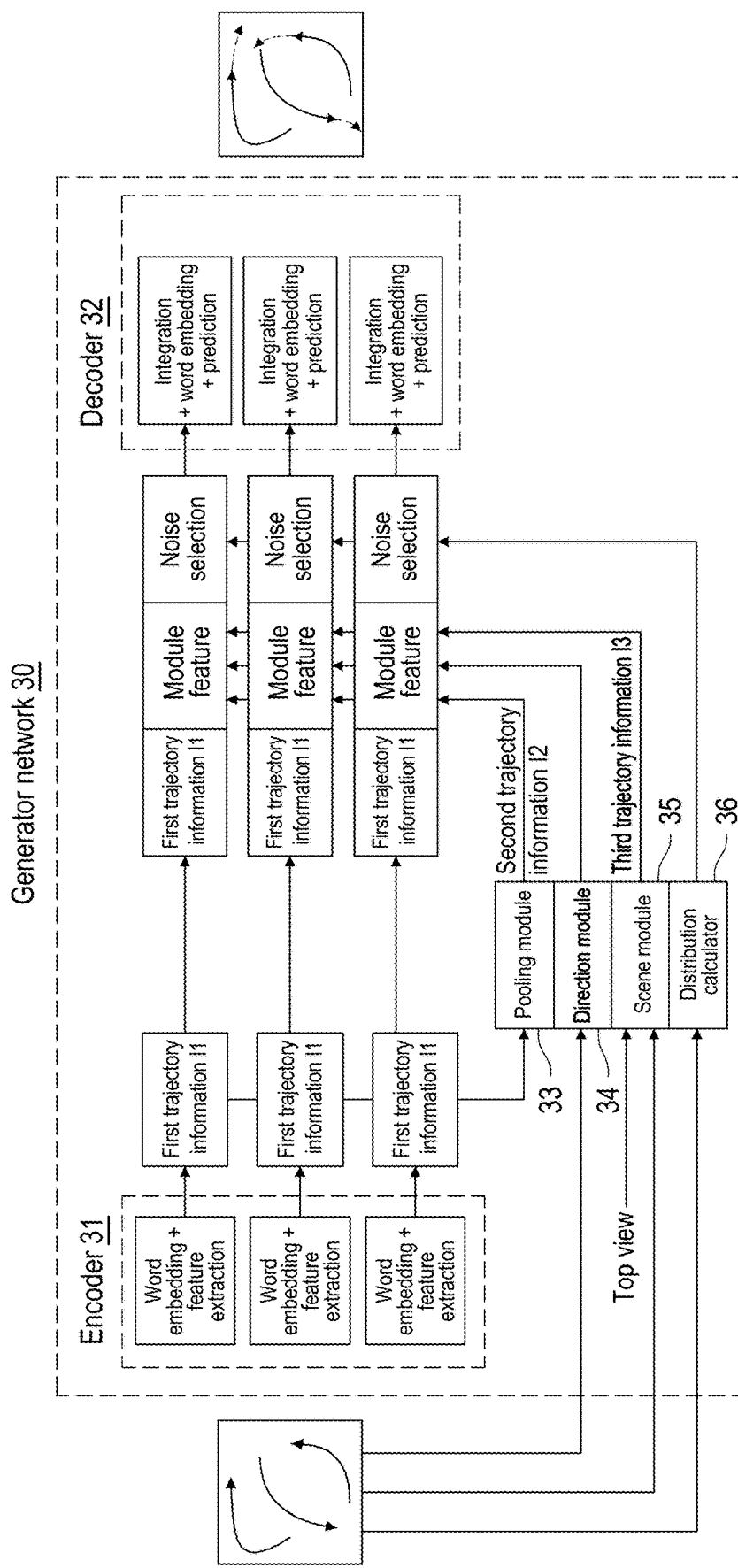
FIG. 3A is a schematic diagram of a generator network according to an embodiment of the disclosure.

On the other hand, the processor 12 executes a predicting model stored in the memory 11. The predicting model is used to generate subsequent predicted trajectories based on the past trajectories. The predicting model has a social generative adversarial network (GAN) architecture. The predicting model includes a generator network. FIG. 3A is a schematic diagram of a generator network 30 according to an embodiment of the disclosure. Please refer to FIG. 3A. The generator network 30 includes an encoder 31 and a decoder 32, that is, has an encoder-decoder architecture. The past trajectories are input into the encoder 31. In an embodiment, the encoder 31 is a long short-term memory (LSTM) module of one or more target objects. The LSTM model is a temporal recurrent neural network (RNN) and is used to perform feature extraction. In some application scenarios, the LSTM module is suitable for processing and predicting important events with long intervals and delays in time series, such as predicting trajectories. The encoder 31 is used to obtain a hidden state representing moving characteristics reflected by the past trajectories, and the first trajectory information includes the hidden state. For example, a latent feature of an i-th person (that is, a certain target object) in an instant scene captured by the LSTM module at the time t is the hidden state. The hidden states at different times capture the moving characteristics over time. The moving characteristics may be speed, acceleration, step size, and/or direction (that is, features from feature extraction).

In other embodiments, the encoder 31 may use other neural networks, such as an RNN, a continuous recurrent neural network (C-RNN), or other networks suitable for capturing temporal features. In some embodiments, before inputting into the LSTM module or other modules for feature extraction, the processor 12 may also form the locations in the past trajectories into fixed lengths by using a word embedding function.

Figure 3B:
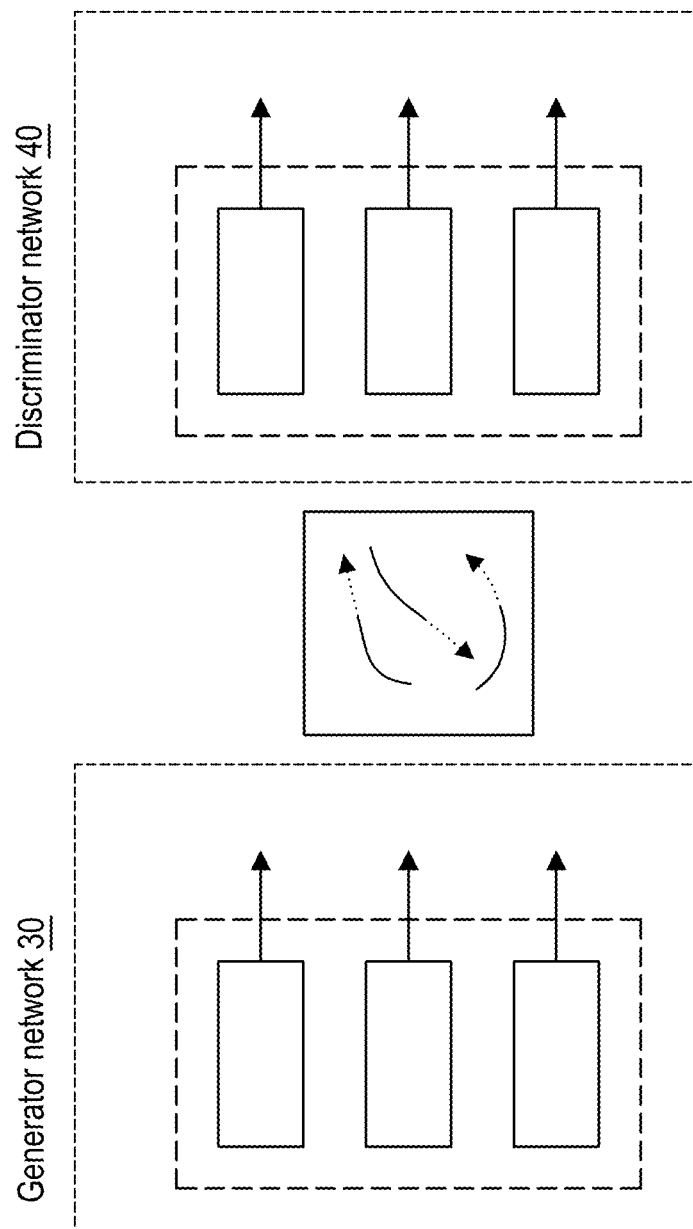
FIG. 3B is a schematic diagram of a generator network and a discriminator network according to an embodiment of the disclosure.

Other details of the generator network 30 will be described in subsequent embodiments. It is also worth noting that the output of the generator network 30 is used by a discriminator network to identify authenticity. The authenticity is, for example, true or false. FIG. 3B is a schematic diagram of the generator network 30 and a discriminator network 40 according to an embodiment of the disclosure. Please refer to FIG. 3B. The output of the generator network 30 is the predicted trajectory. The discriminator network 40 may include an encoder. The encoder may be an LSTM or other models. The trained discriminator network 40 may judge whether the predicted trajectory is true or false.

Figure 4:
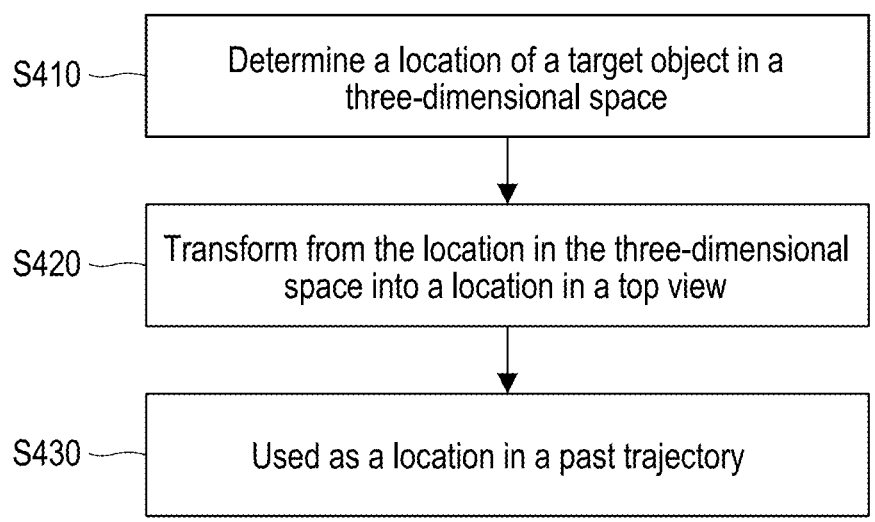
FIG. 4 is a flowchart of trajectory generation according to an embodiment of the disclosure.

On the other hand, the location in the past trajectory may be obtained not only through satellite positioning and base station positioning, but also through image positioning. FIG. 4 is a flowchart of trajectory generation according to an embodiment of the disclosure. Please refer to FIG. 4. The processor 12 may obtain one or more images captured by one or more image capturing devices (not shown). The image capturing device may be a two-dimensional or three-dimensional camera, a video camera, a three-dimensional scanner, a depth sensor, a monitor, a smart phone, a driving recorder, or a roadside unit or a mobile robot with image capturing function to capture two-dimensional and/or three-dimensional images within a specified field of view accordingly.

The processor 12 determines a location of the target object in a three-dimensional space (Step S410). Taking a three-dimensional point cloud image (that is, a three-dimensional image) as an example, the three-dimensional point cloud image includes sensing points of one or more target objects. Each sensing point records a depth or a distance of a local region of the target object relative to a viewing location. The viewing location may be where the image capturing device is located. The processor 12 may confirm the object type through image identification technology, and determine the specific object type, such as a pet, an adult, or a child, accordingly. Then, the processor 12 may compare the three-dimensional point cloud image according to an image identification result, and select a region of interest (RoI) or a bounding box of the target object of the object type in the three-dimensional point cloud image accordingly. In the three-dimensional point cloud image, the region of interest or the bounding box covers the target object and may represent the location of the target object in the three-dimensional space. For the two-dimensional image, the processor 12 may transform the location (obtained based on the image identification result) of the target object in an image into a location in the three-dimensional space through homography transformation or other camera space transformations.

It is worth noting that processing manners of point cloud information may be divided into "voxel-based" and "point-based". The point-based manners may be further divided into "ordered point cloud" and "disordered point cloud". The voxel-based manner is to down-sample the three-dimensional point cloud image through setting the size of a voxel (hereinafter collectively referred to as a voxel size). If the voxel size is smaller, the usage space of the memory 11 is fairly high (possibly a cubic growth), but the loss is smaller and the resolution is higher. If the voxel size is larger, the loss is larger, but the resolution may be reduced, and the usage space of the memory 11 is relatively low. Compared to the voxel-based manner, the point-based manner may have issues such as additional space consumption or irregular access.

Figure 5:
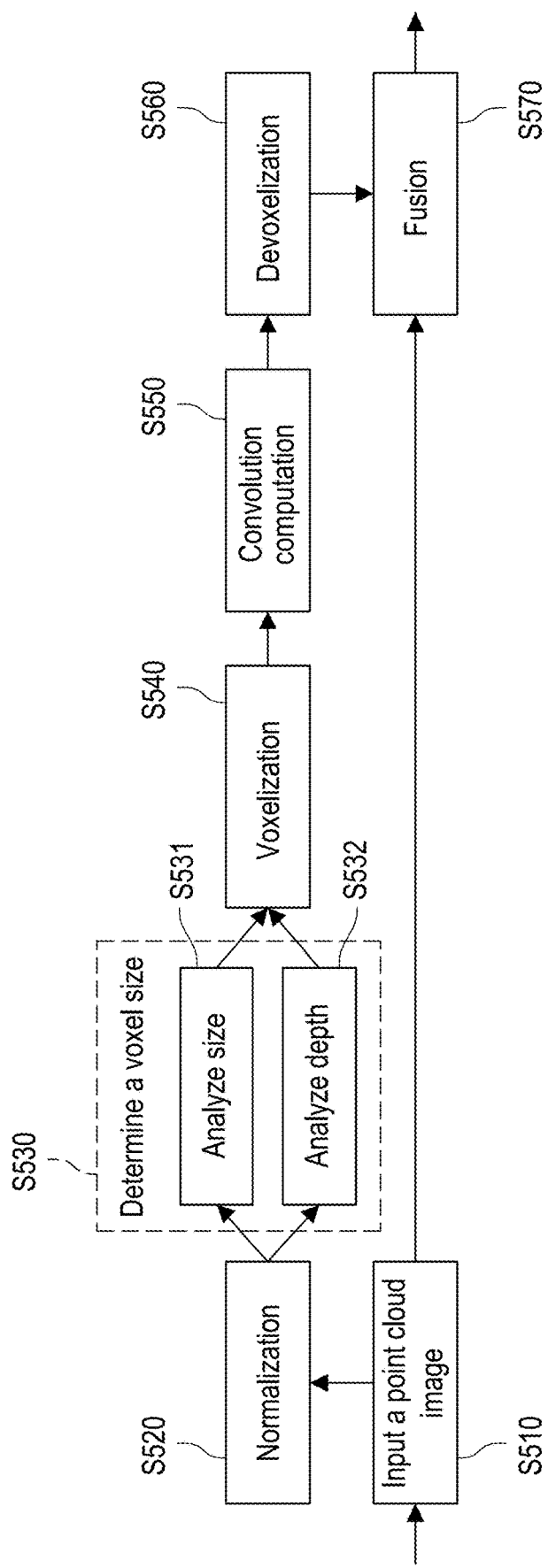
FIG. 5 is a flowchart of point cloud information processing according to an embodiment of the disclosure.

It is also worth noting that a point-voxel convolution neural network (PVCNN) combines point-based and voxel-based computations. FIG. 5 is a flowchart of point cloud information processing according to an embodiment of the disclosure. Please refer to FIG. 5. The upper branch of the PVCNN architecture is the voxel-based computation, which is used to establish a neighborhood relationship between voxels and construct a neighborhood feature accordingly. On the other hand, the lower branch of the architecture is the point-based computation, which is used to perform feature transformation on the point cloud information through a multilayer perceptron (MLP).

Although the PVCNN can achieve a balance between the point-based and voxel-based computations, the setting of the voxel size in the voxel-based computation is not flexible, and there is redundant space usage. Therefore, the embodiment of the disclosure provides an adaptive improvement mechanism.

Specifically, the processor 12 inputs the three-dimensional point cloud image (Step S510), and normalizes the three-dimensional point cloud image (Step S520), so that information of different point cloud scales is adjusted to inputs with the same reference datum.

Before performing voxelization, the processor 12 may first determine the voxel size (Step S530). The voxel size refers to a specific size in which one or more pixel points in a three-dimensional region are used as one voxel. Unlike the fixed voxel size, the voxel size according to the embodiment of the disclosure may be changed according to the analysis and a judgment result of the current scenario.

Figure 6:
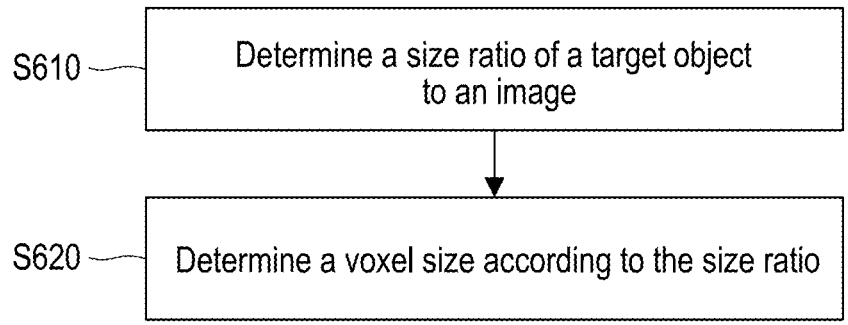
FIG. 6 is a flowchart of size-based voxel size determination according to an embodiment of the disclosure.

In an embodiment, for analyzing size (Step S531), FIG. 6 is a flowchart of size-based voxel size determination according to an embodiment of the disclosure. Please refer to FIG. 6. The processor 12 may determine the size ratio of one or more target objects to the image obtained by the image capturing device (Step S610). The size ratio is the ratio of the length, width, and height of the target object or the bounding box of the object type. For example, the ratio of width, height, and length of a person is approximately 1:2:1, and the ratio of a car is approximately 1:1:2. Therefore, the bounding box is usually set to 64 pixels*128 pixels. The processor 12 may determine the voxel size according to the size ratio (Step S620). For example, the processor 12 may query a look-up table or use a formula to obtain the correspondence between the size ratio and the voxel size.

Figure 7:
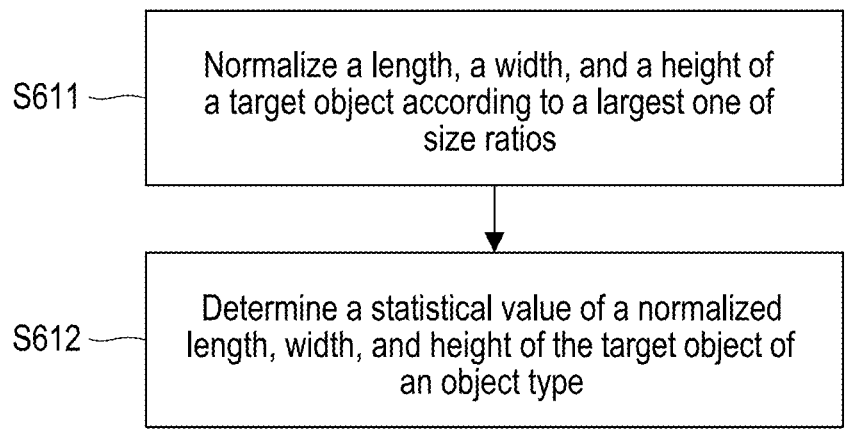
FIG. 7 is a flowchart of training a voxel size according to an embodiment of the disclosure.

An appropriate voxel size can save the amount of computations without affecting positioning performance. In order to train the appropriate voxel size, training data needs to be referred. The training data is labeled point cloud data. Labeled means that the target object in the point cloud image is labeled with the bounding box, the region of interest, or a three-dimensional object box. FIG. 7 is a flowchart of training a voxel size according to an embodiment of the disclosure. Please refer to FIG. 7. For a specific object type, the processor 12 may normalize the length, the width, and the height of the target object of the object type in the training data according to the largest one of the size ratios (Step S611). For example, the processor 12 may select the largest one/value from the length, the width, and the height of the labeled three-dimensional object box, and then divide the length, the width, and the height by the largest one to complete normalization.

The processor 12 may determine a statistical value of the normalized length, width, and height of the target object of the object type (Step S612). The statistical value is, for example, mean, median, or mode. Assuming that there are three persons, the processor 12 may calculate the mean of the normalized length, width, and height of the three persons. The statistical value of the normalized length, width, and height is used as a reference of the voxel size. For example, the ratio formed by the statistical value is directly used as the voxel size. For another example, weight is given to the ratio formed by the statistical value, and the voxel size is obtained accordingly. Since the statistical value is for different object types, the corresponding voxel size may also be different for different object types. In some embodiments, the memory 11 may also store statistical values and/or voxel sizes provided by other devices for the processor 12 to use.

FIG. 8A and FIG. 8B are point cloud images of two voxel sizes according to an embodiment of the disclosure. Please refer to FIG. 8A. The ratio of width, height, and length is 1:1:1, and the voxel size is 2×2×2. Please refer to FIG. 8B. The ratio of width, height, and length is 1:4:1, and the voxel size is 2×8×2. Although the voxel density of FIG. 8B is lower, the overall characteristics (for example, outline, color, etc.) are not much different from FIG. 8A. However, the amount of information of FIG. 8B is lower, thereby speeding up the processing speed of voxelization and reducing the usage space for recording information.

In an embodiment, for analyzing depth (Step S532), FIG. 9 is a flowchart of depth-based voxel size determination according to an embodiment of the disclosure. Please refer to FIG. 9. The processor 12 may determine the depth of one or more target objects relative to a scanning location in the image captured by the image capturing device (Step S910). That is, the image is the image scanned by the image capturing device at the scanning location. The depth is the distance between the scanning location and the target object. In an embodiment, the sensing points or pixel points in the three-dimensional point cloud image may record the depth (value). In another embodiment, the sensing points or the pixel points in a depth map may record the depth.

Figure 10B:
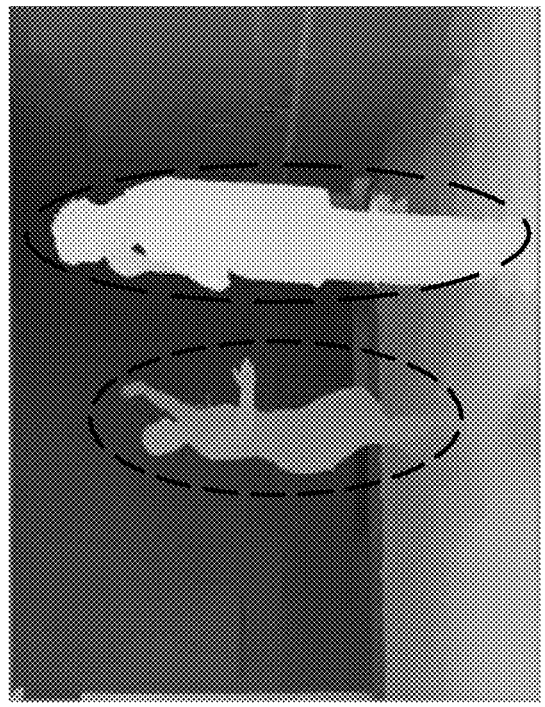
FIG. 10A and FIG. 10B are schematic diagrams of depth clustering according to an embodiment of the disclosure.
Figure 10A:
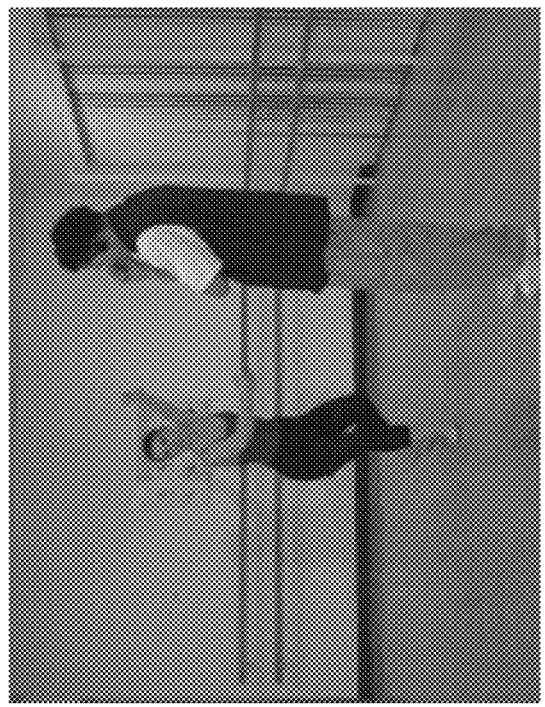

In an embodiment, the processor 12 may perform clustering on the depth (value) through a clustering algorithm (for example, k-means, gaussian mixture model (GMM), or density-based spatial clustering of applications with noise (DBSCAN) algorithm), and determine a specific point cloud region as a candidate target object according to a clustering result. For example, FIG. 10A and FIG. 10B are schematic diagrams of depth clustering according to an embodiment of the disclosure. Please refer to FIG. 10A and FIG. 10B. FIG. 10A is a two-dimensional image (for example, recording red, green, and blue information). FIG. 10B is a depth map image. The same pixel value or grayscale value is used for pixel points with the same depth in the depth map. It can be known from FIG. 10B that if the pixel points belong to the same object, the depths thereof are approximately the same or fall within a certain interval. Through the clustering method, two target objects circled by dashed lines may be obtained.

Please refer to FIG. 9. The processor 12 may determine the voxel size according to the depth (Step S920). In an embodiment, a larger depth corresponds to a smaller voxel size, and a smaller depth corresponds to a larger voxel size. That is, compared to the voxel size corresponding to a farther target object, the voxel size corresponding to a closer target object is larger, thereby reducing the amount of information. For example, the voxel size used for the farther target object is 1×1×1, and the voxel size used for the closer target object is 4×4×4. Although the voxel size is larger, the output of voxelization still retains enough information for identification.

The processor 12 may assign corresponding voxel sizes to different depth ranges. For example, a depth of 0.5 meters (m) to 4 m is calculated in units of 0.5 m. If the depth of the clustered target object falls between 0.5 m and 1 m, the voxel size thereof is 2×2×2. If the depth of the clustered target object falls between 1 m and 1.5 m, the voxel size thereof is 4×4×4, and so on.

Figure 11A:
FIG. 11A to FIG. 11C are point cloud images of different voxel sizes according to an embodiment of the disclosure.
Figure 11B:
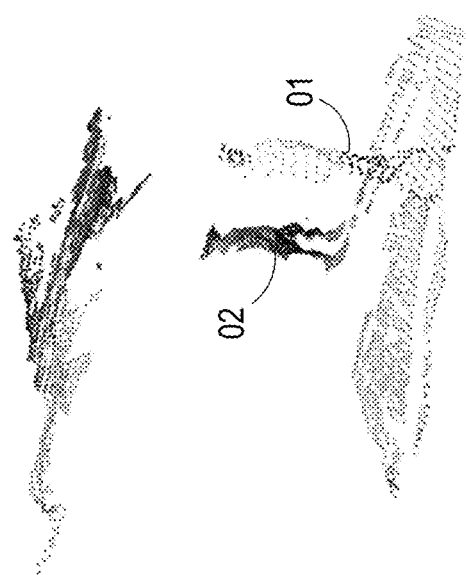
Figure 11C:
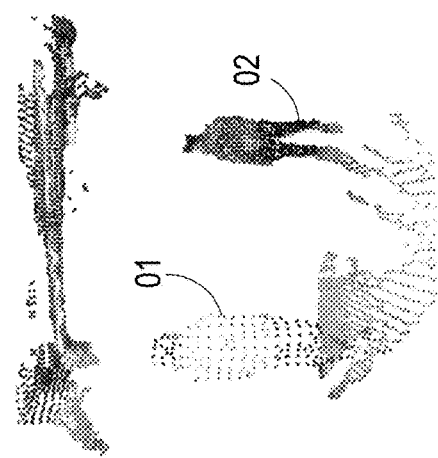

Taking an actual field application as an example, FIG. 11A to FIG. 11C are point cloud images of different voxel sizes according to an embodiment of the disclosure. Please refer to FIG. 11A to FIG. 11C, which are respectively point cloud images at different viewing angles, and voxel sizes are changed according to corresponding depths of target objects O1 and O2. As shown in FIG. 11A, the closer target object O1 has a larger proportion of information, but a detailed description thereof does not need to be provided. In order for the target objects O1 and O2 in the field of view to have the same resolution description, a more detailed or smaller voxel size may be provided for the farther target object O2, and a coarser or larger voxel size may be provided for the closer target object O1.

Please refer to FIG. 5, the size and depth analysis may be performed simultaneously or alternatively. After determining the voxel size is (Step S530), the processor 12 may perform voxelization on the input three-dimensional point cloud image according to the determined voxel size (Step S540) to obtain voxels. After obtaining the voxels, the processor 12 may complete feature integration through a three-dimensional volumetric convolution computation (Step S550), and transform the voxels back into a point cloud image through devoxelization (Step S560) to be fused with the point cloud image after feature transformation (Step S570).

Please refer to FIG. 4. The processor 12 may transform the target object from the location in the three-dimensional space into a location in a top view (Step S420), that is, overhead projection. The processor 12 may calculate a representative location of the target object in the top view. For example, the representative location is the center point, the center of gravity, or any point of the target object. The representative location of the target object is continuously recorded, and the representative locations may be used as the locations in the past trajectories (Step S430).

Please refer to FIG. 2 and FIG. 3A. The processor 12 performs a pooling process on the first trajectory information I1 of the target objects through a pooling module 33 to generate second trajectory information I2 of the target objects (Step S220). Specifically, the pooling process is used to obtain relationships between the first trajectory information I1 of the target objects. For example, the processor 12 concatenates a current location of a certain target object and current locations of other target objects after word embedding with a hidden state, and then inputs into the multilayer perceptron and takes the maximum value. Finally, location relationships of each target object with other target objects, such as a location of a first target object relative to a second target object, a location relative to a third target object, and so on, may be obtained. The second trajectory information I2 of each target object includes the location relationships relative to other target objects.

Please refer to FIG. 2 and FIG. 3A. The processor 12 obtains third trajectory information I3 from the past trajectories of the target objects (Step S230). Specifically, in addition to considering social relationships between the target objects, the disclosure also provides other auxiliary trajectory judgment models. The third trajectory information I3 may include a moving direction, scene information, and/or a moving mode.

In an embodiment, the generator network 30 includes a direction module 34. The past trajectories include multiple directions. The processor 12 may determine the moving direction from one to another one of the locations. For example, the processor 12 may calculate a relative location difference between trajectory point locations sampled at a former and latter time points, and obtain an angle through a trigonometric function based on the relative location difference.

Figure 12B:
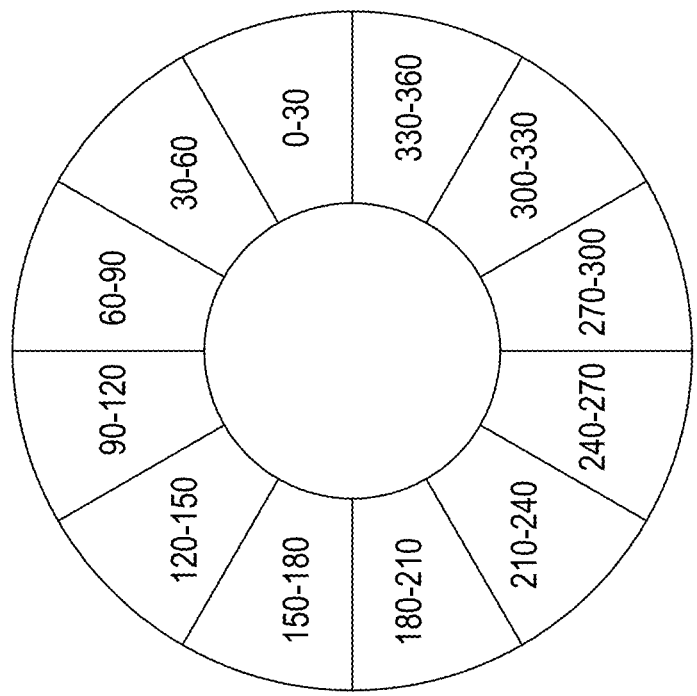
FIG. 12B is a schematic diagram of angle clustering according to an embodiment of the disclosure.
Figure 12A:
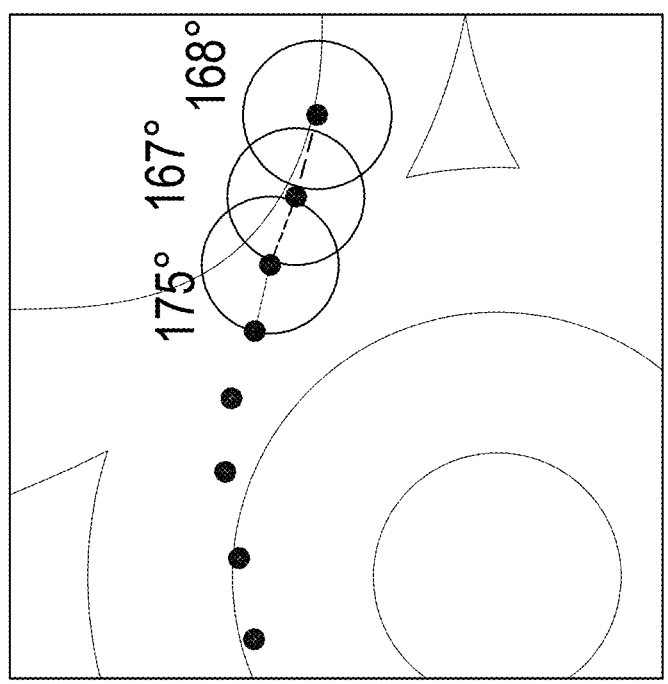
FIG. 12A is a schematic diagram of a trajectory according to an embodiment of the disclosure.

Taking a practical application as an example, FIG. 12A is a schematic diagram of a trajectory according to an embodiment of the disclosure. Please refer to FIG. 12A. The former and latter trajectory point locations may form a connecting line. The moving direction from a first trajectory point location on the right to a second trajectory point location is 168 degrees, the moving direction from the second trajectory point location to a third trajectory point location is 167 degrees, and the moving direction from the third trajectory point location to a fourth trajectory point location is 175 degrees.

The processor 12 may arrange the moving directions corresponding to the locations into a moving trend according to time series. The moving trend shows changes in multiple moving directions arranged according to time series. The third trajectory information includes the moving trend.

In an embodiment, the processor 12 may encode the moving trend as a binary vector. For example, a sequence composed of 0 or 1 is formed through one-hot encoding. The binary vectors of the moving directions are concatenated together to form a moving trend feature. The binary vectors are input into a decoder 132.

For example, FIG. 12B is a schematic diagram of angle clustering according to an embodiment of the disclosure. Please refer to FIG. 12B. The processor 12 may first define an angle difference d (taking d=30 as an example) in an encoding rule, and equally divide 360 degrees through the angle difference d. The processor 12 may generate a series of one-hot codes C according to the locations of the moving directions. Taking the moving direction of 275 degrees as an example, the sequence obtained by encoding is 0000000000100, which is a 360/d+1-bit sequence. The plus one (+1) part is used to record a non-moving state. Furthermore, the smaller the angle difference d, the more detailed the obtained feature. However, if the space cost or other factors are considered, the angle difference d may still be adjusted according to requirements.

For example, please refer to FIG. 12A and FIG. 12B. The moving directions of four trajectory point vectors on the right are 168 degrees, 167 degrees, and 175 degrees. Since the three moving directions all fall within the same interval, the binary vectors thereof are all 0000001000000. If the object is stops moving, the binary vector is 1000000000000, and so on.

It should be noted that the specific time difference between the former and latter time points is related to a sampling frequency when collecting data. Taking 30 frames per second (FPS) as an example, the time difference between the former and latter trajectory points obtained through the sampling frequency is 1/30≈0.033 seconds. However, if the sampling frequency is 5 FPS, the time difference is 1/5=0.2 seconds. Therefore, the time difference between the former and latter time points may still be changed according to actual requirements.

Please refer to FIG. 3A. In an embodiment, the generator network 30 includes a scene module 35. The processor 12 may obtain image information. The image information includes one or more scene objects in the two-dimensional or three-dimensional image captured by the image capturing device. Each image is captured at a certain viewing location from past trajectory of the image capturing device and with the field of view, and the scene objects are objects seen at the viewing locations and with the field of view. The module mainly generates the third trajectory information according to the scene objects around the location of the target object. The types of the scene objects may vary depending on the application. For example, the scene objects in a mobile robot application are walls, beams, tables, and chairs, but not pedestrians. The processor 12 may define the types of the scene objects in advance. The third trajectory information may be for only the defined scene objects and may exclude other undefined objects.

Figure 13:
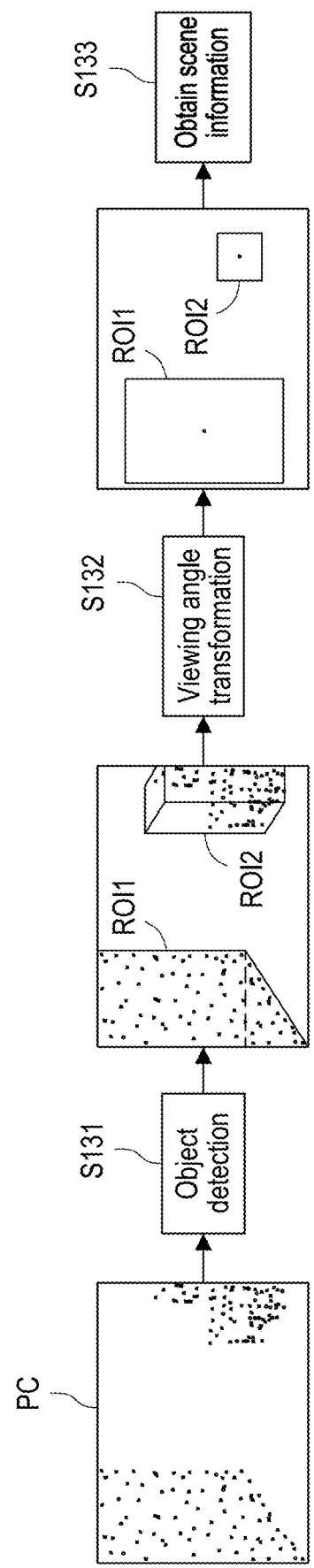
FIG. 13 is a flowchart of scene information generation according to an embodiment of the disclosure.
Figure 14:
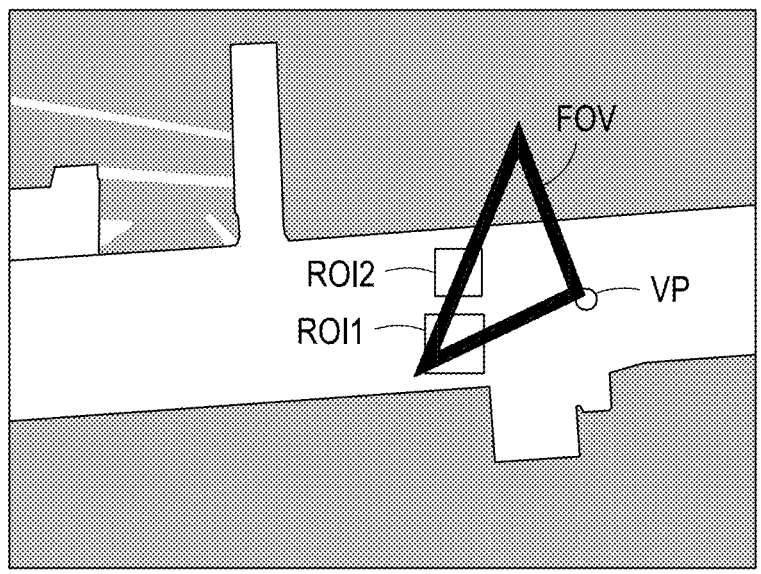
FIG. 14 is a schematic diagram of a projection result according to an embodiment of the disclosure.

The processor 12 may generate the scene information according to the scene objects. The scene information includes relative locations and/or image areas of the scene objects known from the images captured by the image capturing device, and the relative locations are locations relative to the viewing locations of the image capturing device. Specifically, FIG. 13 is a flowchart of scene information generation according to an embodiment of the disclosure. Please refer to FIG. 13. Taking a three-dimensional point cloud PC as an example, the processor 12 may identify the locations (selected by regions of interest ROI1 and ROI2) and the types of the scene objects in the three-dimensional point cloud PC through an object detection algorithm (for example, feature comparison or neural network inference) (Step S131). The processor 12 may transform a viewing angle of an image to a top view (Step S132) to project the regions of interest ROI1 and ROI2 to the top view. For example, FIG. 14 is a schematic diagram of a projection result according to an embodiment of the disclosure. Please refer to FIG. 14, which is a cost map of the mobile robot application. At a viewing location VP, a mobile robot sees the scene objects selected by the regions of interest ROI1 and ROI2 with a field of view FOV (taking a triangular region as an example). The field of view FOV is a reference range of the scene information. It is worth noting that in addition to the scene objects identified through image detection, the processor 12 may also identify other scene objects such as walls or beams in the field of view FOV from the top view (the cost map of the embodiment). It should be noted that the reference range is not limited to the field of view FOV, but may also be a geometrical or irregular-shaped region formed based on the viewing location. In addition, the top view may also be based on a floor plan, an object configuration diagram, or other drawings designed or planned from a top view angle.

Then, using the object type as a unit, the processor 12 may count an area ratio of the region of interest included in each type to the image and/or the relative location relative to (the viewing location of) the target object, and concatenate or select one of the area ratio and a statistical relative location to obtain the scene information (Step S133).

In an embodiment, the processor 12 may determine the area ratio of image areas of all the scene objects of a certain object type to the reference range in the top view. The reference range is a region selected from the top view (for example, the field of view FOV of FIG. 14, but not limited thereto), and the scene information includes the area ratio. For example, the area ratio is a value obtained by dividing the sum of the image areas of the regions of interest of three tables in the field of view by the area of the field of view. Similarly, if there are other object types, the processor 12 determines the area ratio of the object type. In some embodiments, the area may be counted by using image resolution.

In an embodiment, the processor 12 may determine the statistical relative locations of the relative locations of all the scene objects of a certain object type. The scene information includes the statistical relative location. The relative location may be the distance or the number of pixels between the target object and the scene object on a horizontal axis and a vertical axis. For example, the area ratio is a value obtained by dividing the sum of the relative locations of two chairs in the field of view by the total number of chairs (that is, two), that is, the mean of the relative locations. Similarly, if there are other object types, the processor 12 determines the statistical relative locations of the object type. In some embodiments, the statistical relative location may be a weighted computation of the relative locations or the median or the mode of the relative locations.

In an embodiment, if an area ratio R and a statistical relative location (Δx, Δy) are to be concatenated, a concatenation result for a certain object type may be [R, Δx, Δy] or [Δx, Δy, R].

Figure 15:
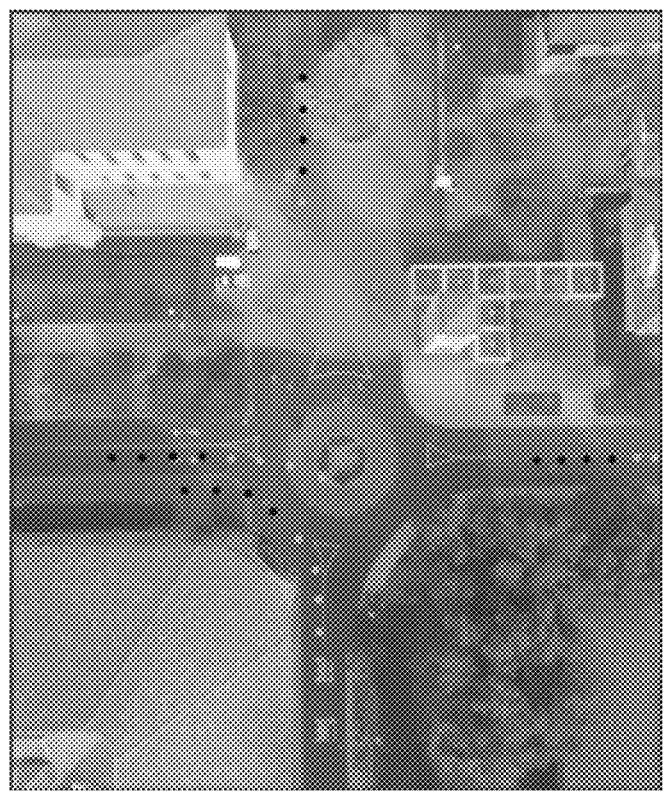
FIG. 15 is a schematic diagram of trajectories of multiple moving modes according to an embodiment of the disclosure.

Please refer to FIG. 3A. In an embodiment, the generator network 30 includes a distribution calculator 36. The processor 12 may determine a corresponding noise distribution according to the moving mode. Specifically, the conventional social generative adversarial network gives the same preset noise under a Gaussian distribution to input data for generative adversarial. However, the distribution calculator 36 may provide different noises to the predicting model for the training of the generator network 30 for different moving modes. The moving mode may be walking straight, turning left, turning right, or stationary, but not limited thereto. For example, FIG. 15 is a schematic diagram of trajectories of multiple moving modes according to an embodiment of the disclosure. Please refer to FIG. 15. Different trajectories (formed by connecting dots in the drawing) may be different moving modes. For example, the top, left, and right trajectories are straight forward, but the bottom trajectory is turning left.

In an embodiment, information of the moving modes may be based on relative distances between sampling points in the past trajectory. Since the moving mode of the target object may change at any time, the processor 12 may set a relationship filter value (which may be determined according to experience and the sampling frequency of the data), and filter the trajectory point locations accordingly, thereby distinguishing between different moving modes. Taking 5 sampling points as an example, the 5 sampling points may be five trajectory point locations, such as locations of five steps of a pedestrian, in a certain past trajectory. On the other hand, for data filtering, if the distance between the trajectory point locations at the former and latter time points differs by more than the relationship filter value, the information of the two trajectory point locations will not be used by the distribution calculator 36. If the difference between the trajectory point locations at the former and latter time points differs by not more than the relationship filter value, the information of the two trajectory point locations may be used by the distribution calculator 36.

Figure 16:
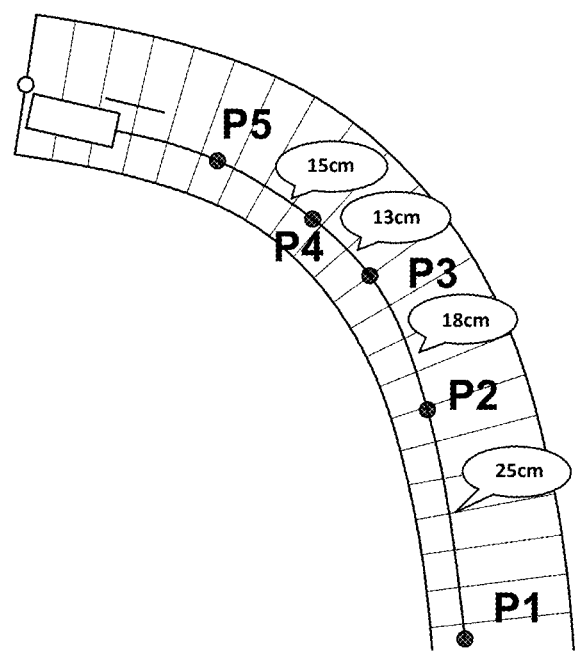
FIG. 16 is a schematic diagram of trajectory screening according to an embodiment of the disclosure.

For example, FIG. 16 is a schematic diagram of trajectory screening according to an embodiment of the disclosure. Please refer to FIG. 16. It is assumed that the relationship filter value is 20 cm. The distance between the locations of a sampling point P1 and a sampling point P2 differs by more than 20 cm, so the processor 12 may ignore/delete/exclude the segment of the trajectory from the sampling point P1 to the sampling point P2. The distance between the locations of the sampling point P2 and a sampling point P3, the distance between the sampling point P3 and a sampling point P4, and the distance between the sampling point P4 and a sampling point P5 differ by less than 20 cm, so the segments of the trajectory may be used by the distribution calculator 36.

Relative location relationships between the sampling point locations in the past trajectories may establish a symmetric matrix. That is, elements in the symmetric matrix are the relative locations of each sampling point and other sampling points. After the processor 12 performs clustering on the symmetric matrix, a clustering result may be obtained. The clusters are the defined different moving modes. For the different moving modes, the processor 12 may determine the noise corresponding to a randomness referenced by the decoder 32 according to the noise distribution corresponding to the moving mode. The predicting model can have a preferred predicting effect for different moving modes through giving different noises.

In an embodiment, the processor 12 may obtain the noise distribution by applying the center (as the mean) and the standard deviation of a certain cluster of the past trajectories after clustering to the Gaussian distribution. However, the type of the noise distribution is not limited to the Gaussian distribution. The processor 12 may randomly select the noise according to the Gaussian distribution.

Figure 17A:
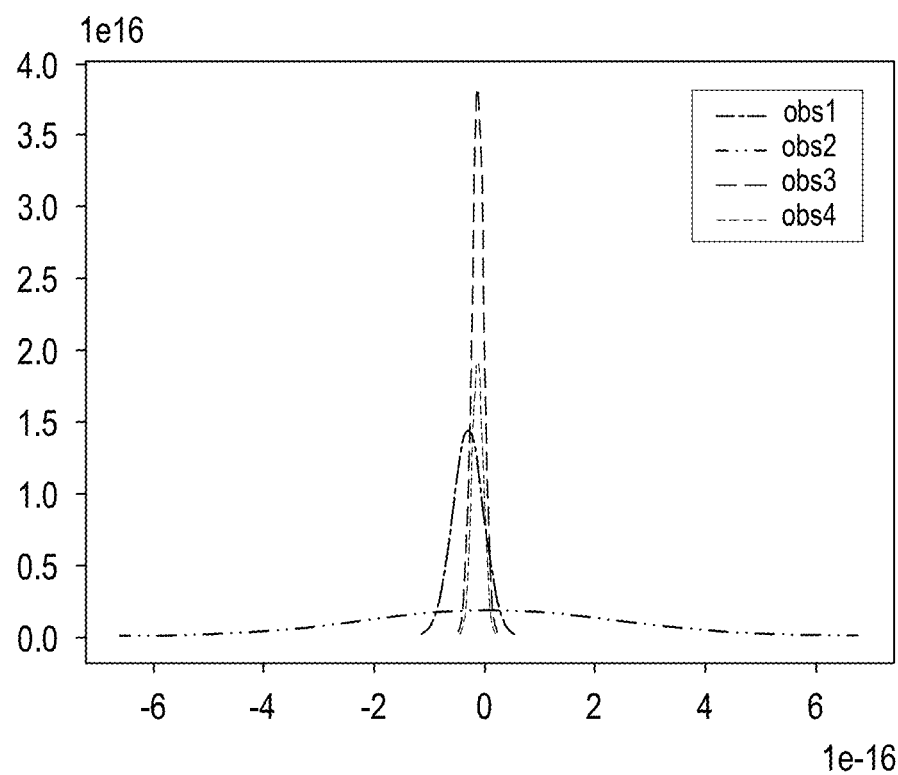
FIG. 17A is a schematic diagram of a probability distribution of noise corresponding to a left turn mode according to an embodiment of the disclosure.
Figure 17B:
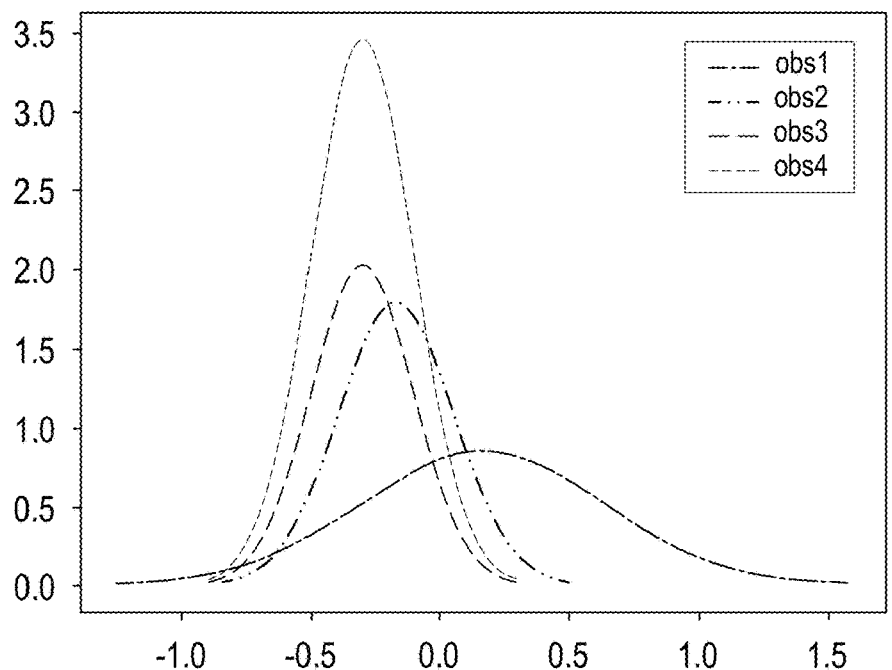
FIG. 17B is a schematic diagram of a probability distribution of noise corresponding to a non-moving mode according to an embodiment of the disclosure.
Figure 17C:
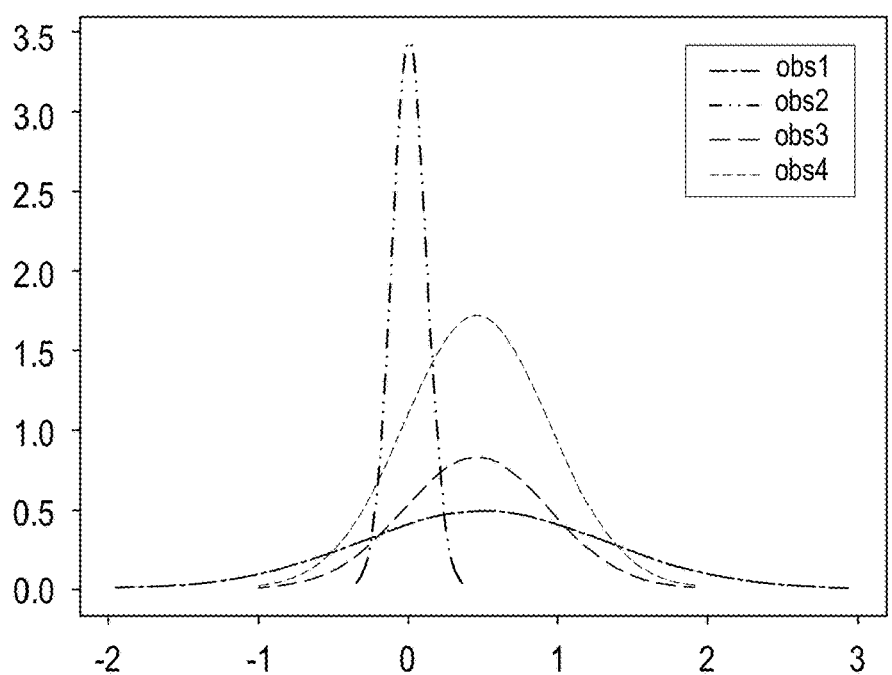
FIG. 17C is a schematic diagram of a probability distribution of noise corresponding to a straight forward mode according to an embodiment of the disclosure.

For example, FIG. 17A is a schematic diagram of a probability distribution of noise corresponding to a left turn mode according to an embodiment of the disclosure, FIG. 17B is a schematic diagram of a probability distribution of noise corresponding to a non-moving mode (or a stationary mode) according to an embodiment of the disclosure, and FIG. 17C is a schematic diagram of a probability distribution of noise corresponding to a straight forward mode according to an embodiment of the disclosure. Please refer to FIG. 17A to FIG. 17C. It is assumed that observed trajectories Obs1 to Obs4 are respectively the trajectories of the pedestrian taking one step, two steps, three steps, and four steps. It can be seen that Gaussian distribution curves of different moving modes may be different Please refer to FIG. 2 and FIG. 3A. The processor 12 generates predicted trajectories of the target objects according to the second trajectory information I2 and the third trajectory information I3 of the target objects through the decoder 32 (Step S240). Specifically, the decoder 32 is an LSTM model and generates the predicted trajectory of each target object according to the second trajectory information I2, the third trajectory information I3, and the noise. For example, the decoder 32 may transform the hidden state into coordinates of a location in a future trajectory. In other embodiments, the decoder 32 may use other neural networks, such as an RNN, a C-RNN, or other networks suitable for processing temporal features.

In an embodiment, the processor 12 may integrate the second trajectory information I2 and the third trajectory information I3 of the target objects through multi-head attention to generate integrated information. For example, the processor 12 respectively performs self-attention processing on the second trajectory information I2 and the third trajectory information I3, and then concatenates results of each set of self-attention to perform linear transformation to obtain the integrated information. The self-attention is, for example, scaled dot-product attention. An attention mechanism may be described as the process of mapping a query and a series of key-value pairs to a certain output, and a vector of the output is a weight sum of weights applied to values calculated and obtained according to the query and the key. In addition, the integrated information is input into the decoder 32.

In summary, in the trajectory predicting method and the computing system for trajectory prediction according to the embodiments of the disclosure, the social relationship and additional auxiliary information (for example, the moving direction, the scene information, and/or the moving mode) are provided for the generator network in the predicting model to improve the predicting accuracy of the predicting model. In addition, the predicting model may also refer to the three-dimensional information and process the three-dimensional point cloud image through the appropriate voxel size to improve the processing efficiency and the utilization of memory space.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A trajectory predicting method based on a predicting model, wherein the predicting model comprises a generator network, the trajectory predicting method comprising:
respectively performing feature extraction on past trajectories of a plurality of target objects through an encoder to generate first trajectory information of the target objects, wherein the encoder is used to obtain a hidden state representing moving characteristics reflected by the past trajectories, and the first trajectory information comprises the hidden state;
performing a pooling process on the first trajectory information of the target objects to generate second trajectory information of the target objects, wherein the pooling process is used to obtain relationships between the first trajectory information of the target objects, and the second trajectory information of each of the target objects comprises location relationships relative to other target objects;
obtaining third trajectory information from the past trajectories of the target objects, wherein the third trajectory information comprises at least one of a moving direction, scene information, and a moving mode; and
generating predicted trajectories of the target objects according to the second trajectory information and the third trajectory information of the target objects through a decoder, by integrating the second trajectory information and the third trajectory information of the target objects through multi-head attention to generate integrated information, wherein the integrated information is input into the decoder, and an output of the generator network is used by a discriminator network to identify authenticity.

2. The trajectory predicting method according to claim 1, wherein the past trajectory comprises a plurality of locations, and the step of obtaining the third trajectory information from the past trajectories of the target objects comprises:
determining the moving direction from one to another one of the locations; and
arranging moving directions corresponding to the locations into a moving trend according to time series, wherein the third trajectory information comprises the moving trend.

3. The trajectory predicting method according to claim 2, further comprising:
encoding the moving trend into a binary vector, wherein the binary vector is input into the decoder.

4. The trajectory predicting method according to claim 1, wherein the step of obtaining the third trajectory information from the past trajectories of the target objects comprises:
obtaining image information, wherein the image information comprises at least one scene object in a first image, the first image is captured at a viewing location from past trajectory and with a field of view, and the at least one scene object is an object viewed from the viewing location and with the field of view; and
generating the scene information according to the at least one scene object, wherein the scene information comprises at least one of a relative location and an image area of the at least one scene object known from the first image, and the relative location is a location relative to the viewing location.

5. The trajectory predicting method according to claim 4, wherein the at least one scene object is of a first object type, and the step of generating the scene information according to the at least one scene object comprises:
determining a statistical relative location of the relative location of all scene objects of the first object type, wherein the scene information comprises the statistical relative location; and/or
transforming a viewing angle of the first image into a top view, and determining an area ratio of all scene objects of the first object type to a reference range in the top view according to the image area of the all scene objects, wherein the reference range is a region selected from the top view, and the scene information comprises the area ratio.

6. The trajectory predicting method according to claim 1, wherein the step of obtaining the third trajectory information from the past trajectories of the target objects comprises:
determining a corresponding noise distribution according to the moving mode; and
determining a noise corresponding a randomness according to the noise distribution.

7. The trajectory predicting method according to claim 1, further comprising:
determining a size ratio of the at least one target object to a second image, wherein the size ratio is a ratio of a length, a width, and a height of the at least one target object;
determining a voxel size according to the size ratio; and
performing voxelization on a three-dimensional point cloud image according to the voxel size, wherein the three-dimensional point cloud image comprises a sensing point of the at least one target object, the three-dimensional point cloud image after the voxelization is used to determine a location of the at least one target object in a three-dimensional space, and a location transformed from the location in the three-dimensional space into a top view is used as one of a plurality of locations in the past trajectory.

8. The trajectory predicting method according to claim 7, wherein the target objects are of a second object type, and the step of determining the voxel size according to the size ratio comprises:
normalizing the length, the width, and the height of the at least one target object of the second object type in training data according to a largest one of the size ratios; and
determining statistical values of normalized lengths, widths, and heights of the target objects of the second object type, wherein the statistical values of the normalized lengths, widths, and heights are used as reference for the voxel size.

9. The trajectory predicting method according to claim 1, further comprising:
determining a depth of the at least one target object relative to a scanning location in a third image, wherein the third image is an image scanned at the scanning location;
determining a voxel size according to the depth, wherein a larger depth corresponds to a smaller voxel size, and a smaller depth corresponds to a larger voxel size; and performing voxelization on a three-dimensional point cloud image according to the voxel size, wherein the three-dimensional point cloud image comprises a sensing point of the at least one target object, the three-dimensional point cloud image after the voxelization is used to determine a location of the at least one target object in a three-dimensional space, and a location transformed from the location in the three-dimensional space into a top view is used as one of a plurality of locations in the past trajectory.

10. A computing system for trajectory prediction, comprising:
   a memory, storing a code; and
   a processor, coupled to the memory for loading and executing the code to:
   execute a predicting model, wherein the predicting model comprises a generator network;
   respectively perform feature extraction on past trajectories of a plurality of target objects through an encoder to generate first trajectory information of the target objects, wherein the encoder is used to obtain a hidden state representing moving characteristics reflected by the past trajectories, and the first trajectory information comprises the hidden state;
   perform a pooling process on the first trajectory information of the target objects to generate second trajectory information of the target objects, wherein the pooling process is used to obtain relationships between the first trajectory information of the target objects, and the second trajectory information of each of the target objects comprises location relationships relative to other target objects;
   obtain third trajectory information from the past trajectories of the target objects, wherein the third trajectory information comprises at least one of a moving direction, scene information, and a moving mode; and
   generate predicted trajectories of the target objects according to the second trajectory information and the third trajectory information of the target objects through a decoder, by integrating the second trajectory information and the third trajectory information of the target objects through multi-head attention to generate integrated information, wherein the integrated information is input into the decoder, and an output of the generator network is used by a discriminator network to identify authenticity.

11. The computing system for trajectory prediction according to claim 10, wherein the past trajectory comprises a plurality of locations, and the processor further:
   determine the moving direction from one to another one of the locations; and
   arrange moving directions corresponding to the locations into a moving trend according to time series, wherein the third trajectory information comprises the moving trend.

12. The computing system for trajectory prediction according to claim 11, wherein the processor further:
   encode the moving trend into a binary vector, wherein the binary vector is input into the decoder.

13. The computing system for trajectory prediction according to claim 10, wherein the processor further:
   obtain image information, wherein the image information comprises at least one scene object in a first image, the first image is captured at a viewing location from past trajectory and with a field of view, and the at least one scene object is an object viewed from the viewing location and with the field of view; and
   generate the scene information according to the at least one scene object, wherein the scene information comprises at least one of a relative location and an image area of the at least one scene object known from the first image, and the relative location is a location relative to the viewing location.

14. The computing system for trajectory prediction according to claim 13, wherein the at least one scene object is of a first object type, and the processor further:
   determine a statistical relative location of the relative location of all scene objects of the first object type, wherein the scene information comprises the statistical relative location; and/or
   transform a viewing angle of the first image into a top view, and determine an area ratio of all scene objects of the first object type to a reference range in the top view according to the image area of the all scene objects, wherein the reference range is a region selected from the top view, and the scene information comprises the area ratio.

15. The computing system for trajectory prediction according to claim 10, wherein the processor further:
   determine a corresponding noise distribution according to the moving mode; and
   determine a noise corresponding a randomness according to the noise distribution.

16. The computing system for trajectory prediction according to claim 10, wherein the processor further:
   determine a size ratio of the at least one target object to a second image, wherein the size ratio is a ratio of a length, a width, and a height of the at least one target object;
   determine a voxel size according to the size ratio; and
   perform voxelization on a three-dimensional point cloud image according to the voxel size, wherein the three-dimensional point cloud image comprises a sensing point of the at least one target object, the three-dimensional point cloud image after the voxelization is used to determine a location of the at least one target object in a three-dimensional space, and a location transformed from the location in the three-dimensional space into a top view is used as one of a plurality of locations in the past trajectory.

17. The computing system for trajectory prediction according to claim 16, wherein the target objects are of a second object type, and the processor further:
   normalize the length, the width, and the height of the at least one target object of the second object type in training data according to a largest one of the size ratios; and
   determine statistical values of normalized lengths, widths, and heights of the target objects of the second object type, wherein the statistical values of the normalized lengths, widths, and heights are used as reference for the voxel size.

18. The computing system for trajectory prediction according to claim 10, wherein the processor further:
   determine a depth of the at least one target object relative to a scanning location in a third image, wherein the third image is an image scanned at the scanning location;
   determine a voxel size according to the depth, wherein a larger depth corresponds to a smaller voxel size, and a smaller depth corresponds to a larger voxel size; and
   perform voxelization on a three-dimensional point cloud image according to the voxel size, wherein the three-dimensional point cloud image comprises a sensing point of the at least one target object, the three-dimensional point cloud image after the voxelization is used to determine a location of the at least one target object in a three-dimensional space, and a location transformed from the location in the three-dimensional space into a top view is used as one of a plurality of locations in the past trajectory.

\* \* \* \* \*